(12) United States Patent
Park et al.

(10) Patent No.: US 10,412,607 B2
(45) Date of Patent: Sep. 10, 2019

(54) ELECTRONIC DEVICE AND METHOD FOR PROCESSING DATA IN ELECTRONIC DEVICE

(71) Applicant: Samsung Electronics Co., Ltd., Suwon-si, Gyeonggi-do (KR)

(72) Inventors: Sung-Jin Park, Seoul (KR); Hye-Jeong Kim, Suwon-si (KR); Yun-Gyu Bae, Suwon-si (KR); Jong-Min Baik, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 328 days.

(21) Appl. No.: 14/640,778

(22) Filed: Mar. 6, 2015

(65) Prior Publication Data

US 2016/0105812 A1 Apr. 14, 2016

(30) Foreign Application Priority Data

Oct. 13, 2014 (KR) .......................... 10-2014-0137631

(51) Int. Cl.
*H04W 24/08* (2009.01)
*H04W 4/06* (2009.01)
*H04L 12/26* (2006.01)
*H04L 1/16* (2006.01)
*H04L 1/18* (2006.01)
*H04L 1/00* (2006.01)

(52) U.S. Cl.
CPC .......... *H04W 24/08* (2013.01); *H04L 1/1678* (2013.01); *H04L 1/1887* (2013.01); *H04L 43/0829* (2013.01); *H04W 4/06* (2013.01); *H04L 2001/0093* (2013.01); *H04L 2001/0097* (2013.01)

(58) Field of Classification Search
CPC . H04L 12/1868; H04L 1/1816; H04L 1/1887; H04L 1/1819; H04L 1/189; H04W 40/00; H04W 40/10; H04W 8/005
See application file for complete search history.

(56) References Cited

U.S. PATENT DOCUMENTS

| | | | | |
|---|---|---|---|---|
| 7,184,421 B1* | 2/2007 | Liu | ....................... | H04L 12/189 370/254 |
| 7,542,459 B2* | 6/2009 | Conner | ................... | H04L 45/20 370/351 |
| 7,961,741 B2* | 6/2011 | van Greunen | ........ | H04L 67/104 370/235 |
| 9,661,476 B2* | 5/2017 | Wang | ..................... | H04L 12/189 |
| 9,780,923 B2* | 10/2017 | Noh | ....................... | H04L 1/1628 |
| 2004/0213231 A1* | 10/2004 | Cho | ........................ | H04L 1/1671 370/390 |
| 2005/0226182 A1* | 10/2005 | Itoh | ....................... | H04L 1/0003 370/329 |

(Continued)

*Primary Examiner* — Chi Ho A Lee
(74) *Attorney, Agent, or Firm* — Jefferson IP Law, LLP

(57) ABSTRACT

An electronic device and method for the electronic device to process data are provided. The method includes retrieving information associated with at least one neighboring terminal, requesting, when the loss of data transmitted to a plurality of electronic devices is determined, transmission of the data of which a loss is determined, from the at least one neighboring terminal, based on the retrieved information associated with the at least one neighboring terminal and receiving the data of which the loss is determined, in response to the request.

32 Claims, 10 Drawing Sheets

(56) References Cited

U.S. PATENT DOCUMENTS

| | | | |
|---|---|---|---|
| 2005/0226198 A1* | 10/2005 | Barak | H04B 7/265 |
| | | | 370/345 |
| 2008/0025323 A1* | 1/2008 | Khan | H04L 27/3488 |
| | | | 370/400 |
| 2008/0056290 A1* | 3/2008 | Hegde | H04L 47/10 |
| | | | 370/412 |
| 2010/0017673 A1 | 1/2010 | Lu et al. | |
| 2011/0038301 A1* | 2/2011 | Park | H04B 7/2606 |
| | | | 370/315 |
| 2012/0069793 A1 | 3/2012 | Chung et al. | |
| 2012/0140677 A1 | 6/2012 | Choi et al. | |
| 2014/0082652 A1 | 3/2014 | Bhogal et al. | |
| 2014/0098759 A1 | 4/2014 | Noh et al. | |
| 2015/0139227 A1* | 5/2015 | Kim | H04L 1/0076 |
| | | | 370/390 |
| 2016/0044733 A1* | 2/2016 | Soriaga | H04W 76/025 |
| | | | 370/329 |

\* cited by examiner

ELECTRONIC DEVICE AND METHOD FOR PROCESSING DATA IN ELECTRONIC DEVICE

CROSS-REFERENCE TO RELATED APPLICATION(S)

This application claims the benefit under 35 U.S.C. § 119(a) of a Korean patent application filed on Oct. 13, 2014 in the Korean Intellectual Property Office and assigned Serial number 10-2014-0137631, the entire disclosure of which is hereby incorporated by reference.

TECHNICAL FIELD

The present disclosure relates to an electronic device and a method for an electronic device to process data of which loss or abnormal reception is determined.

BACKGROUND

Electronic devices (e.g., smart phones) may include a plurality of communication modules to support various communication schemes, for example, Wireless Fidelity (Wi-Fi), Wi-Fi direct, Bluetooth (BT), Near Field Communication (NFC), a Global Positioning System (GPS), cellular communication (e.g., Long-Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile communications (GSM), and the like), and the like.

The electronic device may receive data transmitted from a base station to a plurality of electronic devices. The electronic device may be aware, in advance, of a reception time when the data is to be received. For example, when the data is not identified at the reception time, the electronic device may request retransmission of the data from the base station. In addition, when the electronic device fails to decode the received data, the electronic device may request retransmission of the data of which decoding failed.

The above information is presented as background information only to assist with an understanding of the present disclosure. No determination has been made, and no assertion is made, as to whether any of the above might be applicable as prior art with regard to the present disclosure.

SUMMARY

When a plurality of electronic devices requests retransmission of data from a base station, load on a network may increase.

In addition, when a base station retransmits data to a plurality of electronic devices, repeatedly, it may disturb the communication among other electronic devices and may waste radio resources while identical data is repeatedly retransmitted. Aspects of the present disclosure are to address at least the above-mentioned problems and/or disadvantages and to provide at least the advantages described below.

According to various embodiments of the present disclosure, an electronic device and a method for an electronic device to process data may determine data that is lost, search for information associated with a neighboring terminal, and request retransmission of the data that is lost, at a transmission power corresponding to a location of the neighboring terminal. In addition, an electronic device that is requested to execute retransmission, may retransmit data that is lost to an electronic device that requests the retransmission, and may transfer a message received from a base station to the electronic device that requests the retransmission.

In accordance with an aspect of the present disclosure, a method for an electronic device to process data is provided. The method includes retrieving information associated with at least one neighboring terminal, requesting, when a loss of data transmitted to a plurality of electronic devices is determined, transmission of the data of which the loss is determined, from the at least one neighboring terminal, based on the retrieved information associated with the at least one neighboring terminal, and receiving the data of which the loss is determined, in response to the request.

In accordance with another aspect of the present disclosure, an electronic device is provided. The electronic device includes a communication interface configured to retrieve information associated with at least one neighboring terminal, and receives data, and a processor configured to control the communication interface to request transmission of data of which a loss is determined from the at least one neighboring terminal, based on the retrieved information associated with the at least one neighboring terminal, when the loss of data transmitted to a plurality of electronic devices is determined, and to control the communication interface to receive the data of which the loss is determined, in response to the request.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
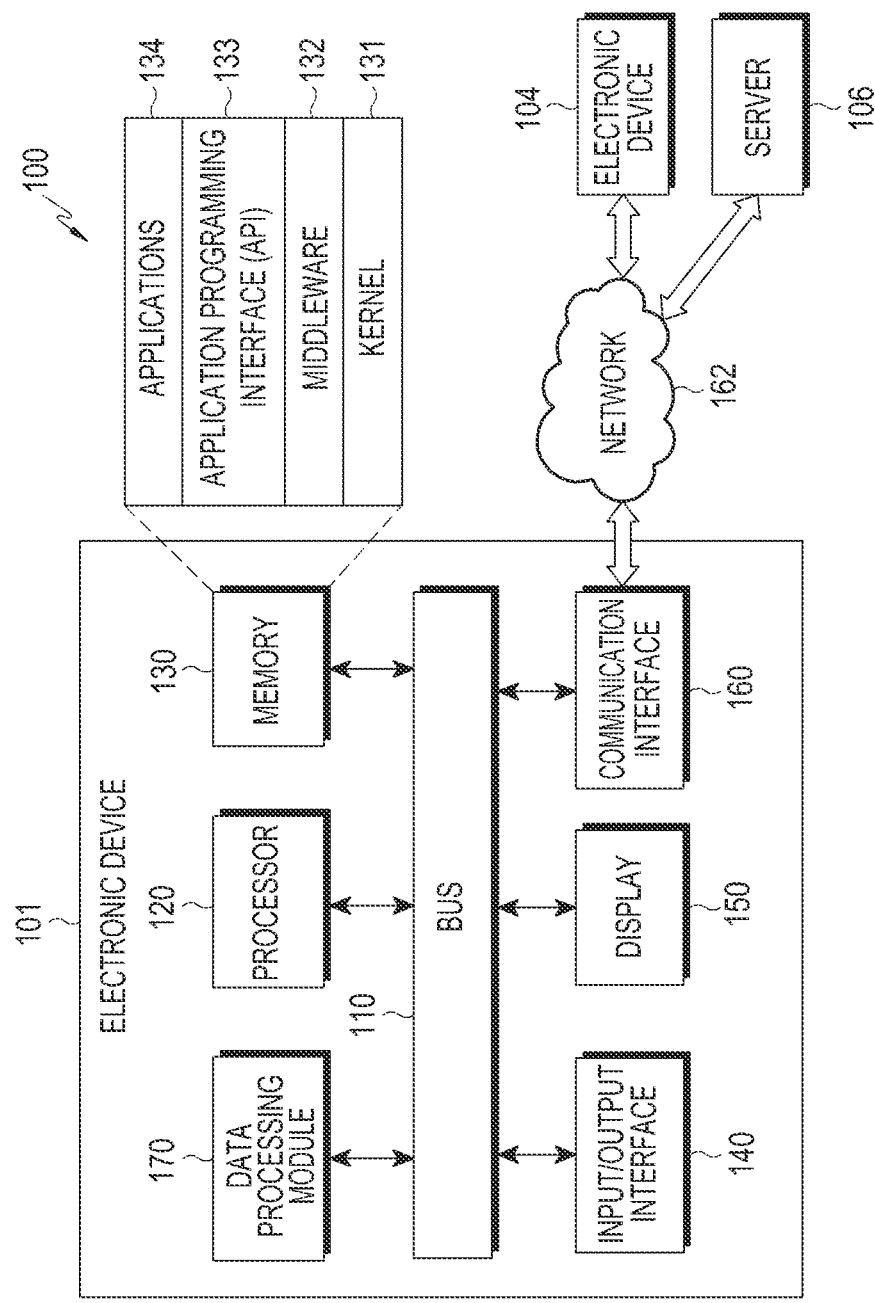
FIG. 1 is a diagram illustrating an example of a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the terms "include" or "may include", which may be used in various embodiments of the present disclosure, refer to the presence of disclosed functions, operations or elements, and do not restrict the addition of one or more functions, operations or elements. Further, as used in various embodiments of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" in various embodiments of the disclosure means the inclusion of at least one or all of the disclosed elements. For example, the expression "A or B" may include A, may include B, or may include both A and B.

The expressions such as "first," "second," and the like used in various embodiments of the present disclosure may modify various component elements in the various embodiments but may not limit corresponding component elements. For example, the above expressions do not limit the sequence and/or importance of the corresponding elements. The expressions may be used to distinguish a component element from another component element. For example, a first user device and a second user device indicate different user devices although both of them are user devices. For example, a first constituent element may be termed a second constituent element, and likewise a second constituent element may also be termed a first constituent element without departing from the scope of various embodiments of the present disclosure.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms as used in various embodiments of the present disclosure are merely for the purpose of describing particular embodiments and are not intended to limit the various embodiments of the present disclosure.

Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to embodiments of the present disclosure may be a device including a communication function. For example, the electronic devices may include at least one of smart phones, tablet personal computers (PCs), mobile phones, video phones, e-book readers, desktop PCs, laptop PCs, netbook computers, personal digital assistants (PDAs), portable multimedia players (PMPs), Moving Picture Experts Group (MPEG-1 or MPEG-2) Audio Layer III (MP3) players, mobile medical devices, cameras, wearable devices (e.g., head-mounted-devices (HMDs) such as electronic glasses), electronic clothes, electronic bracelets, electronic necklaces, electronic appcessories, electronic tattoos, or smart watches.

According to some embodiments of the present disclosure, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, television (TV) boxes (e.g., HomeSync™ of Samsung, Apple TV™, or Google TV™), game consoles, electronic dictionaries, electronic keys, camcorders, or electronic frames.

According to some embodiments of the present disclosure, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments of the present disclosure, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

According to various embodiments of the present disclosure, an "electronic device" may be interchangeably used with a "terminal" in the following descriptions. For example, the "electronic device" may be replaced with any term that refers to a device, which includes a communication function and is capable of transceiving data.

According to various embodiments of the present disclosure, loss data in an electronic device or a terminal may include data of which normal reception fails from among data that are scheduled to be transmitted to a plurality of electronic devices or data corresponding to received data that is abnormally decoded, and any data of which normal reception is not identified for various reasons from among data of which reception is predicted.

According to various embodiments of the present disclosure, with respect to at least one terminal, neighboring terminal information may include, at least one of data identification information, transmitter identification information (e.g., serving cell information), retransmission time information (e.g., recent transmission time), message identification information, reservation information, status information (e.g., signal quality information, terminal mobility information, reception signal strength information (e.g., Signal-to-Noise Ratio (SNR), Signal to Interference plus Noise Ratio (SINR), and Noise and Interference (NI)), distance information associated with a distance to at least one terminal that communicates with the neighboring terminal, location information of the neighboring terminal (e.g., dormancy state information, idle state information, sleep state information, wake-up state information for communication, power on/off state information of a device), and device capability information. In addition, any parameter that may affect data transmission in a terminal may be the neighboring terminal information.

Hereinafter, the electronic device according to various embodiments of the present disclosure will be described with reference to the accompanying drawings. The term "user" used in various embodiments of the present disclosure may refer to a person who uses an electronic device or a device (e.g., an artificial intelligence electronic device) that uses an electronic device.

FIG. 1 is a diagram illustrating an example of a network environment including an electronic device according to various embodiments of the present disclosure.

Referring to FIG. 1, a network environment 100 may include at least one electronic device (e.g., an electronic device 101 and an electronic device 104), a network 162, and a server 106.

The electronic device 101 may include a bus 110, a processor 120, a memory 130, an input/output interface 140, a display 150, a communication interface 160, and a data processing module 170, but is not limited thereto.

The bus 110 may be a circuit to connect the above-described components with one another and to transfer communication (e.g., control messages) among the above-described components.

The processor 120 may receive a command from other components (e.g., the memory 130, the input/output interface 140, the display 150, the communication interface 160, or the data processing module 170) through the bus 110, decrypt the received command, and perform calculation or data processing according to the decrypted command.

The memory 130 may store commands or data received from or generated by the processor 120 or other components (e.g., the input/output interface 140, the display 150, the communication interface 160, the data processing module 170, and the like). The memory 130 may include programming modules, for example, a kernel 131, a middleware 132, an Application Programming Interface (API) 133, an application 134, and the like. Each of the programming modules described above may be formed of software, firmware, and hardware, or a combination thereof.

The kernel 131 may control or manage system resources (e.g., the bus 110, the processor 120, the memory 130, and the like) which are used in performing operations or functions implemented by other programming modules, for example, the middleware 132, the API 133 or the application 134. Furthermore, the kernel 131 may provide an interface through which the middleware 132, the API 133, and the application 134 may access individual component elements of the electronic device 101 to control or manage them.

The middleware 132 may perform a relay function to allow the API 133 or the application 134 to communicate with the kernel 131 to exchange data. Furthermore, in relation to requests for operation received from the applications 134, the middleware 132 may control (e.g., scheduling or load-balancing) the requests by using, for example, a method of assigning at least one application among the applications 134 with priorities for using system resources (e.g., the bus 110, the processor 120, the memory 130, and the like) of the electronic device 101, and the like.

The API 133 is an interface by which the application 134 control functions provided from the kernel 131 or the middleware 132, and may include, for example, at least one interface or function (e.g., instructions) for file control, window control, image processing, text control, and the like.

According to various embodiments, the application 134 may include a Short Message Service (SMS)/Multimedia Messaging Service (MMS) application, an email application, a calendar application, an alarm application, a health care application (e.g., application for measuring a quantity of exercise or blood sugar) or an application (e.g., application providing information associated with pressure, humidity or temperature). Additionally or alternatively, the application 134 may be an application related to the exchange of information between the electronic device 101 and external electronic devices (e.g., the electronic device 104). The application related to the exchange of information may include, for example, a notification relay application for transferring predetermined information to the external electronic device or a device management application for managing the external electronic device.

For example, the notification relay application may include a function of transferring, to the external electronic device (e.g., the electronic device 104), notification information generated from other applications of the electronic device 101 (e.g., an SMS/MMS application, an e-mail application, a health management application, an environmental information application, and the like). Additionally or alternatively, the notification relay application may receive notification information from, for example, external electronic device (e.g., the electronic device 104) and provide the same to a user. The device management application may manage (e.g., install, remove, or update) at least a part of functions (e.g., turning on/off the external electronic device (or some components of the external electronic device) or controlling a brightness of the display) of the external electronic device (e.g., electronic device 104) communicating with the electronic device 101, an application executed in the external electronic device, or a service (e.g., call service or message service) provided by the external electronic device.

According to various embodiments of the present disclosure, the application 134 may include an application designated according to a property (e.g., type of electronic device) of the external electronic device (e.g., electronic device 104). For example, in a case where the external electronic device is an MP3 player, the application 134 may include an application related to the reproduction of music. Similarly, when the external electronic device is a mobile medical device, the application 134 may include an application related to the health care. According to an embodiment of the present disclosure, the application 134 may include at least one of an application designated to the electronic device 101 and an application received from an external electronic device (e.g., the server 106 or the electronic device 104).

The input/output interface 140 may transfer commands or data, which are input by a user through input/output devices (e.g., sensors, keyboards, or touch screens), to the processor 120, the memory 130, the communication interface 160, or the message management module 170 through, for example, the bus 110. For example, the input/output interface 140 may provide, to the processor 120, data associated with a user's touch which is input through the touch screen. Furthermore, through the input/output device (e.g., a speaker or a display), the input/output interface 140 may output commands or data received from the processor 120, the memory 130, the communication interface 160, or the communication control module 170 through the bus 110. For example, the input/output interface 140 may output voice data processed by the processor 120 to the user through the speaker.

The display 150 may display various pieces of information (e.g., multimedia data, text data, and the like) to the user.

The communication interface 160 may connect communication between the electronic device 101 and the external device (e.g., the electronic device 104 or the server 160). For example, the communication interface 160 may be connected to a network 162 through wireless communication or wired communication to communicate with the external electronic device. The wireless communication may include at least one of, for example, Wireless Fidelity (Wi-Fi), Bluetooth (BT), Near Field Communication (NFC), GPS and cellular communication (e.g., Long Term Evolution (LTE), LTE-A, Code Division Multiple Access (CDMA), Wideband CDMA (WCDMA), Universal Mobile Telecommunication System (UMTS), Wireless Broadband (WiBro), Global System for Mobile communication (GSM), and the like). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment of the present disclosure, the network 162 may be a communication network. The communication network may include at least one of a computer network, the internet, the Internet of things, and a telephone network. According to an embodiment of the present disclosure, protocols (e.g., a transport layer protocol, a data link layer protocol, or a physical layer protocol) for communication between the electronic device 101 and external electronic devices may be supported by at least one of the application 134, the API 133, the middleware 132, the kernel 131, and the communication interface 160.

The display processing module 170 may process at least a part of the information obtained from other components (e.g., processor 120, memory 130, input/output interface 140, or communication interface 160) and provide the processed information to a user in various ways. For example, the data processing module 170 may control at least some functions of the electronic device 101 by using the processor 120 or independently from the same so that the electronic device 101 may interoperate with other electronic devices (e.g., the electronic device 104 or the server 106).

For example, when expected data is not received or abnormally received data is identified, the data processing module 170 may request the corresponding data from a neighboring terminal. Through the following descriptions with reference to FIG. 2, additional information associated with the data processing module 170 will be provided.

Figure 2:
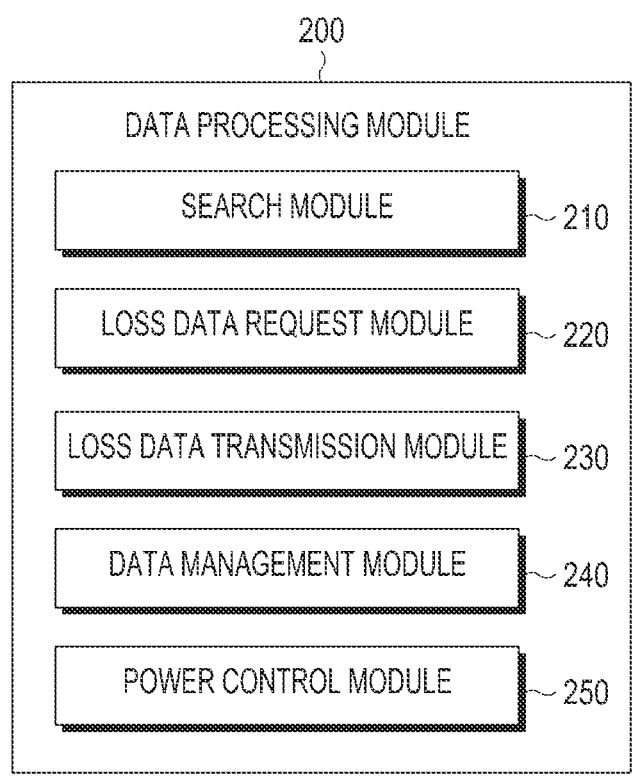
FIG. 2 is a block diagram illustrating an example of a configuration of a data processing module of an electronic device according to various embodiments of the present disclosure.

FIG. 2 is a block diagram illustrating an example of a configuration of a data processing module of an electronic device according to various embodiments of the present disclosure. A data processing module according to various embodiments of the present disclosure may be included in an electronic device (e.g., the electronic device 101) or a processor (e.g., the processor 120) as a separate entity, and may operate to control the operations of the electronic device.

Referring to FIG. 2, a data processing module 200 may include at least one of a search module 210, a loss data request module 220, a loss data transmission module 230, a data management module 240, and a power control module 250.

The search module 210 may search for information associated with a neighboring terminal. For example, when data of which reception is scheduled or data of which decoding fails is identified, the search module 210 may search for information associated with at least one terminal that is capable of retransmitting the identified data.

For example, a terminal including the data processing module 200 may support at least one Remote Access Technology (RAT) (e.g., a single RAT).

For example, the terminal may support cellular communication (e.g., LTE) and short-range communication (e.g., Wi-Fi). According to various embodiments of the present disclosure, the search module 210 may search for neighboring terminals through a short-range communication network supported by the terminal.

The loss data request module 220 may request loss data from at least one neighboring terminal based on the neighboring terminal information when data of which reception is scheduled or data of which decoding fails is identified.

When the loss data transmission module 230 receives a loss data request from a neighboring terminal, the loss data transmission module 230 may transmit data in response to the request. According to various embodiments of the present disclosure, when a transmission power is determined through the received loss data request, the loss data transmission module 230 may determine a distance to the corresponding terminal based on the determined transmission power. The loss data transmission module 230 may transmit the loss data at a minimum power that may allow the data to arrive the determined distance, in response to the request.

When the transmission power of the loss data request is not determined, a minimum power that may allow data to arrive a corresponding terminal may be set as a transmission power for transmitting the loss data, based on the retrieved neighboring terminal information.

According to various embodiments of the present disclosure, the loss data transmission module 230 may transmit the loss data based on an RAT corresponding to a terminal that is to receive the data. For example, when the terminal that is to receive the data does not support the cellular communication (e.g., LTE) but supports only the short-range communication (e.g., Wi-Fi), according to various embodiments of the present disclosure, the loss data transmission module 230 may transmit the loss data through a short-range communication network.

The data management module 240 may manage the retrieved neighboring terminal information. For example, the data management module 240 may add information associated with a terminal that is newly identified through a process of searching for neighboring terminal information, and execute update using changed information. The neighboring terminal information may include at least one of data identification information, transmitter identification information, retransmission available time information, message identification information, reservation information, status information, and device capability information.

The data identification information may include time information associated with when a predetermined data is lost or a time when decoding of a predetermined data fails, (sub)frame information, sequence information, Hybrid Automatic Retransmit Request (HARQ) information, Acknowledgement (ACK) information, and the like. According to various embodiments of the present disclosure, the data processing module 200 may identify a predetermined data based on the data identification information, and may execute retransmission of the identified data.

The transmitter identification information may include an Internet Protocol (IP) address, a Media Access Control (MAC) address, communication access information associated with communication that currently connects, a cell identification (ID), a Cell Radio Network Temporary Identifier (C-RNTI), an International Mobile Subscriber Identity (IMSI), a Globally Unique Temporary Identifier (GUTI), a System Architecture Revolution (SAE) Temporary Mobile Subscriber Identity (S-TMSI), an International Mobile station Equipment Identity (IMEI), a session ID, or a message type, and the like. According to various embodiments of the present disclosure, the data processing module 200 may execute a control so as to retransmit loss data to a predetermined terminal or to request the data, based on the transmitter identification information.

The retransmission available time information may include time information associated with when corresponding data is to be transmitted, and time information associated with when a predetermined terminal is capable of receiving data when the data is transmitted to the corresponding terminal. According to various embodiments of the present disclosure, the data processing module 200 may execute a control so as to receive or request loss data at a predetermined time, based on the transmitter identification information.

The message identification information may include the type of message. According to various embodiments of the present disclosure, the data processing module 200 may determine a type of message that a predetermined terminal is capable of receiving, and retransmit loss data by converting the data into a receivable format or request loss data. For example, the type of receivable message may be changed based on a communication scheme that may be supported by a corresponding electronic device.

The reservation information may include a predetermined time section for a predetermined terminal According to various embodiments of the present disclosure, the data processing module 200 may determine time section information set in advance for a predetermined terminal, and may execute a control so as to retransmit or request loss data in the corresponding time section.

The status information may include at least one of information associated with a communication status of a corresponding terminal, a channel status, an emergency situation, a communication status of a predetermined terminal that is to receive loss data, a network status, and a traffic status. According to various embodiments of the present disclosure, the data processing module 200 may execute a control so as to retransmit or request loss data, based on the situation information.

The device capability information may include capability information associated with a corresponding terminal (e.g., the electronic device 101). For example, the device capability information corresponds to information associated with capabilities related to data communication of a corresponding terminal, and may include mobility information of a corresponding terminal (e.g., information indicating that a corresponding terminal has low mobility), time information set for the data communication (e.g., information indicating that a terminal transceives data during only a predetermined period of time), or data communication amount information (e.g., information indicating that a small amount of data transmission is executed). For example, the capability information may include whether a sensor (e.g., a humidity sensor or a temperature sensor) exists.

According to various embodiments of the present disclosure, when loss data needs to be measured using a predetermined sensor, the various embodiments may execute a control so as to retransmit loss data to a predetermined terminal including the corresponding sensor or to request loss data, based on retrieved neighboring terminal information.

The power control module 250 may control a transmission power used for requesting loss data from at least one terminal included in neighboring terminal information, or a transmission power used for transmitting requested loss data to a corresponding terminal from a neighboring terminal.

For example, an electronic device according to various embodiments of the present disclosure includes a communication interface that searches for information associated with at least one neighboring terminal, and receives data, and a processor that controls the communication interface to request at least one of the neighboring terminals to transmit data of which loss is determined based on the retrieved information associated with at least one neighboring terminal when loss of data transmitted to a plurality of electronic devices is determined, and controls the communication interface to receive the data of which loss is determined, in response to the request.

For example, the data transmitted to the plurality of devices according to various embodiments of the present disclosure may correspond to broadcasting data or multicasting data.

For example, the processor according to various embodiments of the present disclosure may set a transmission power based on the information associated with at least one neighboring terminal, and may control the communication interface to request transmission of the data of which loss is determined, at the set transmission power.

For example, when the processor according to various embodiments of the present disclosure may determine data of which reception is scheduled and fails to identify the data at the scheduled time, loss of data is determined.

For example, when the received data is abnormally decoded, the processor according to various embodiments of the present disclosure may determine that the abnormally decoded data is lost.

For example, when the processor according to various embodiments of the present disclosure detects that data is received through the communication interface and fails to measure the received data, the processor may control the communication interface to transfer the received data to at least one terminal including a module that is capable of measuring the received data, based on the information associated with at least one neighboring terminal.

For example, the processor according to various embodiments of the present disclosure detects that data is received through the communication interface and fails to decode the received data normally, the processor determined that the received data is lost.

For example, the processor according to various embodiments of the present disclosure determines a time for entering a sleep mode of a predetermined terminal, and may control the communication interface to request loss data after the time for entering the sleep mode.

For example, the processor according to various embodiments of the present disclosure determines a communication scheme that is capable of retransmitting data of which loss is determined, based on the information associated with at least one neighboring terminal, and may control the communication interface to request transmission of the data of which loss is determined, through the determined communication scheme.

For example, the processor according to various embodiments of the present disclosure includes, in the request, time information associated with a desired time for reception, and may control the communication interface to receive the data of which loss is determined at the desired time for reception, in response to the request.

For example, the processor according to various embodiments of the present disclosure may manage the information associated with at least one neighboring terminal, and may update the information associated with at least one neighboring terminal when information associated with at least one new neighboring terminal is determined as a result of the search.

For example, the processor according to various embodiments of the present disclosure predicts a time when communication is unavailable, based on the information associated with at least one neighboring terminal, and may control the communication interface to receive the data of which loss is determined, after the predicted time.

For example, the processor according to various embodiments of the present disclosure requests data associated with at least one identifier, and may control the communication interface to receive the data associated with the at least one identifier in response to the request.

For example, the at least one identifier according to various embodiments of the present disclosure may include at least one of time information associated with when reception fails, frame information, an IP address, cell identification information, terminal identification information, capability information associated with capability of a terminal that requests reception of data, radio environment status, emergency status, and security information.

Figure 3:
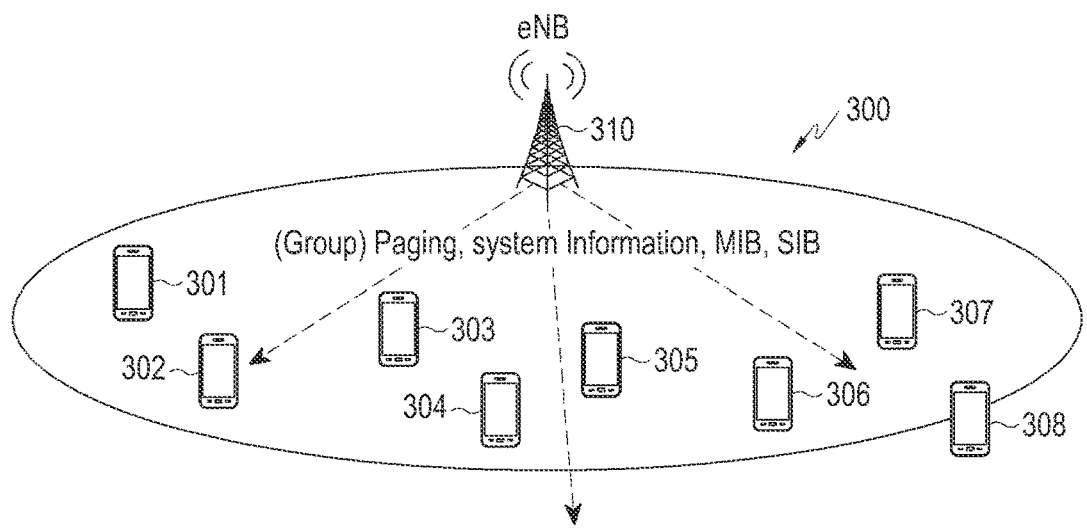
FIG. 3 is a diagram illustrating an example of a network environment according to various embodiments of the present disclosure.

FIG. 3 is a diagram illustrating an example of a network environment according to various embodiments of the present disclosure.

Referring to FIG. 3, a network environment includes a base station 310 (e.g., Evolved Universal Terrestrial Radio Access Network (E-UTRAN) node b (eNB)), and it is assumed that an area 300 where the base station 310 is capable of executing communication, includes at least one terminal 301 through 308.

The base station 310 may transmit data to the at least one terminal 301 through 308, through multicasting or broadcasting. Multicasting is a scheme of transferring data to a plurality of designated electronic devices, and broadcasting is a scheme of transferring data to all of the electronic devices in a corresponding network. For example, data that is multicasted or broadcasted may include at least one of group paging information, system information, Master Information Block (MIB) information, and System Information Block (SIB) information.

The at least one terminal 301 through 308 may be aware, in advance, of a time when the data is to be multicasted or broadcasted.

According to various embodiments of the present disclosure, when it is determined that the data to be multicasted or broadcasted is lost or the data of which normal reception fails, the at least one terminal 301 through 308 may request a neighboring terminal to retransmit the data of which loss or abnormal reception is determined.

Figure 4:
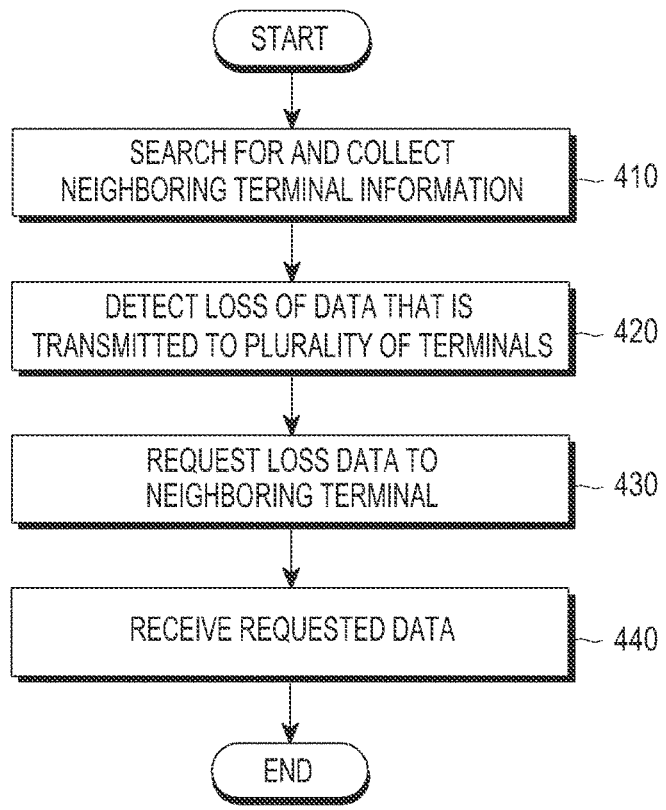
FIG. 4 is a flowchart illustrating an example of operations of a terminal according to various embodiments of the present disclosure.

FIG. 4 is a flowchart illustrating an example of operations of a terminal according to various embodiments of the present disclosure.

Referring to FIG. 4, a terminal searches for information associated with a neighboring terminal and collects retrieved information, in operation 410.

In operation 420, the terminal may detect that data (e.g., broadcast data or multicast data to be transmitted to a plurality of terminals) to be received by the terminal is lost.

In operation 430, the terminal may request loss data to a neighboring terminal, based on the collected information associated with a neighboring terminal.

In operation 440, the terminal may receive the data from at least one neighboring terminal.

At least one operation may be omitted from the operations of FIG. 4 or at least one different operation may be added to the operations. In addition, the operations of FIG. 4 may be processed in order of the flowchart, or an order of at least one operation may be changed with an order of another operation.

For example, a method for an electronic device to process data according to various embodiments of the present disclosure includes an operation of searching for information associated with at least one neighboring terminal, an operation of requesting at least one of the neighboring terminals to transmit data of which loss is determined, based on the retrieved information associated with at least one neighboring terminal when loss of data transmitted to a plurality of electronic devices is determined, and an operation of receiving the data of which loss is determined, in response to the request.

For example, the data transmitted to the plurality of devices according to various embodiments of the present disclosure may correspond to broadcasting data or multicasting data.

For example, the method for an electronic device to process data according to various embodiments of the present disclosure may further include an operation of setting a transmission power based on the information associated with at least one neighboring terminal, and an operation of requesting transmission of the data of which loss is determined, at the set transmission power.

For example, according to various embodiments of the present disclosure, the operation of requesting the transmission of data of which loss is determined, may include an operation of determining data of which reception is scheduled, and an operation of determining that the data is lost when the data is not identified at the scheduled time.

For example, according to various embodiments of the present disclosure, the operation of requesting the transmission of the data of which loss is determined may include determining that abnormally decoded data is lost when the received data is abnormally decoded.

For example, the method for an electronic device to process data according to various embodiments of the present disclosure may further include an operation of transferring the received data to at least one terminal including a module that is capable of measuring the received data, based on the information associated with at least one neighboring terminal when the electronic device fails to measure the received data.

For example, the method for an electronic device to process data according to various embodiments of the present disclosure, may further include an operation of receiving data, and an operation of determining that the received data is lost when the received data is abnormally decoded.

For example, according to various embodiments of the present disclosure, an operation of searching for information associated with neighboring terminals may include an operation of determining a time for entering a sleep mode of a predetermined terminal, and an operation of requesting loss data after the time for entering the sleep mode.

For example, the method for an electronic device to process data according to various embodiments of the present disclosure may further include an operation of determining a communication scheme that is capable of retransmitting data of which loss is determined, based on the information associated with at least one neighboring terminal, and an operation of requesting transmission of the data of which loss is determined, through the determined communication scheme.

For example, the method for an electronic device to process data according to various embodiments of the present disclosure may further include an operation of including, in the request, time information associated with a desired time for reception, and an operation of receiving the data of which loss is determined at the desired time for reception, in response to the request.

For example, the method for an electronic device to process data according to various embodiments of the present disclosure may further include an operation of managing the information associated with at least one neighboring terminal, and an operation of updating the information associated with at least one neighboring terminal when information associated with at least one new neighboring terminal is determined as a result of the search.

For example, the method for an electronic device to process data according to various embodiments of the present disclosure may further include an operation of predicting a time when communication is unavailable, based on the information associated with at least one neighboring terminal, and an operation of receiving the data of which loss is determined, after the predicted time.

For example, the method for an electronic device to process data according to various embodiments of the present disclosure may further include an operation of requesting data associated with at least one identifier, and an operation of receiving the data associated with the at least one identifier in response to the request.

For example, the at least one identifier according to various embodiments of the present disclosure may include at least one of time information associated with when reception fails, frame information, an IP address, cell identification information, terminal identification information, capability information associated with capability of a terminal that requests reception of data, radio environment status, emergency status, and security information.

Figure 5:
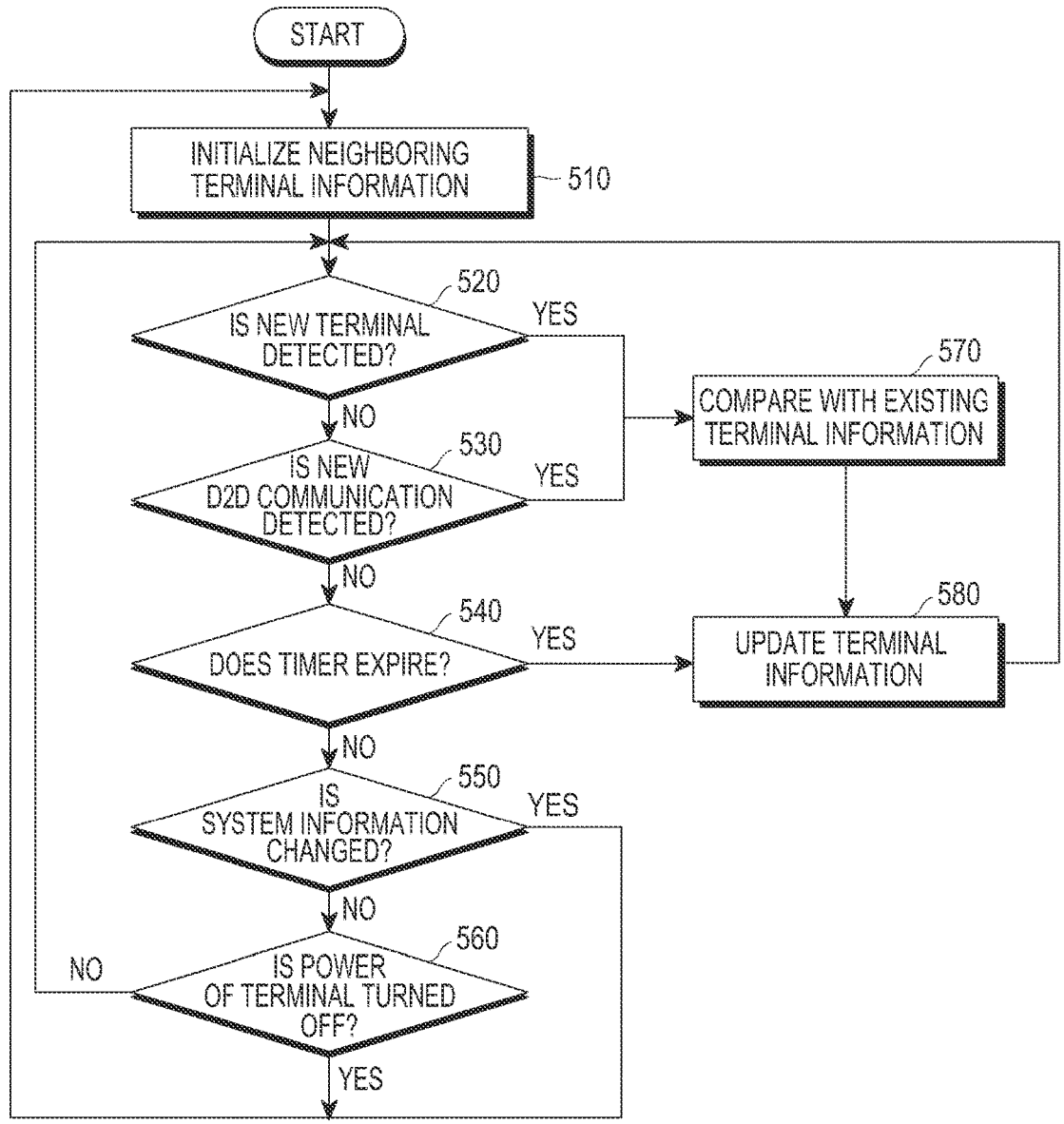
FIG. 5 is a flowchart illustrating an example of an operation of managing information associated with a neighboring terminal, in at least one terminal, according to various embodiments of the present disclosure.

FIG. 5 is a flowchart illustrating an example of an operation of managing information associated with a neighboring terminal, in at least one terminal, according to various embodiments of the present disclosure.

Referring to FIG. 5, a terminal may initialize neighboring terminal information in operation 510. For example, the neighboring terminal may refer to multiple unspecified terminals which may receive data from another electronic device (e.g., a base station) through broadcasting.

In operation 520, the terminal may determine whether a new terminal is detected. For example, the terminal may determine that the detected terminal is new or not based on the stored existing neighboring terminal information.

When the determination in operation 520 shows that a new terminal is detected, the terminal may compare the stored existing terminal information and new terminal information in operation 570. Based on a comparison result, the terminal may update the terminal information by adding the new terminal information.

When the determination in operation 520 shows that a new terminal is not detected, the terminal may determine whether new device-to-device (D2D) communication is detected in operation 530.

When the determination in operation 530 shows that new D2D communication is detected, the terminal may compare information associated with another terminal that executes the new D2D communication with the stored existing neighboring terminal information in operation 570. Based on a comparison result, the terminal may update the terminal information by adding information associated with a subject of the new D2D communication in operation 580.

When the determination in operation 530 shows that new D2D communication is not detected, the terminal may determine whether a timer expires in operation 540. The timer may be a timer for the D2D communication between the terminal and another terminal.

When the determination in operation 540 shows that the timer expires after a predetermined period of time, it is determined that communication with the other terminal is poor and the terminal may delete the information associated with the other terminal with which communication is poor, from the terminal information, in operation 580.

When the determination in operation 540 shows that the timer does not expire after a predetermined period, the terminal may determine whether system information has been changed, in operation 550. For example, the system information may include at least one of serving cell information, Machine type Communications (MTC) group information, and group paging information.

When the determination in operation 550 shows that the system information has been changed, the terminal determines that it enters a new communication environment, and may initialize the existing terminal information again in operation 510.

When the determination in operation 550 shows that the system information is not changed, the terminal may determine whether the power of the terminal is turned off or not in operation 560.

When the determination in operation 560 shows that the power of the terminal has been turned off, the terminal may initialize the terminal information again in operation 510. When the determination in operation 560 shows that the power of the terminal is not turned off, the terminal may determine whether a new terminal is detected again in operation 520.

For example, according to various embodiments of the present disclosure, the terminal may update the neighboring terminal information with information associated with a new detected terminal, new D2D communication environment information, system information, and the like.

Figure 6:
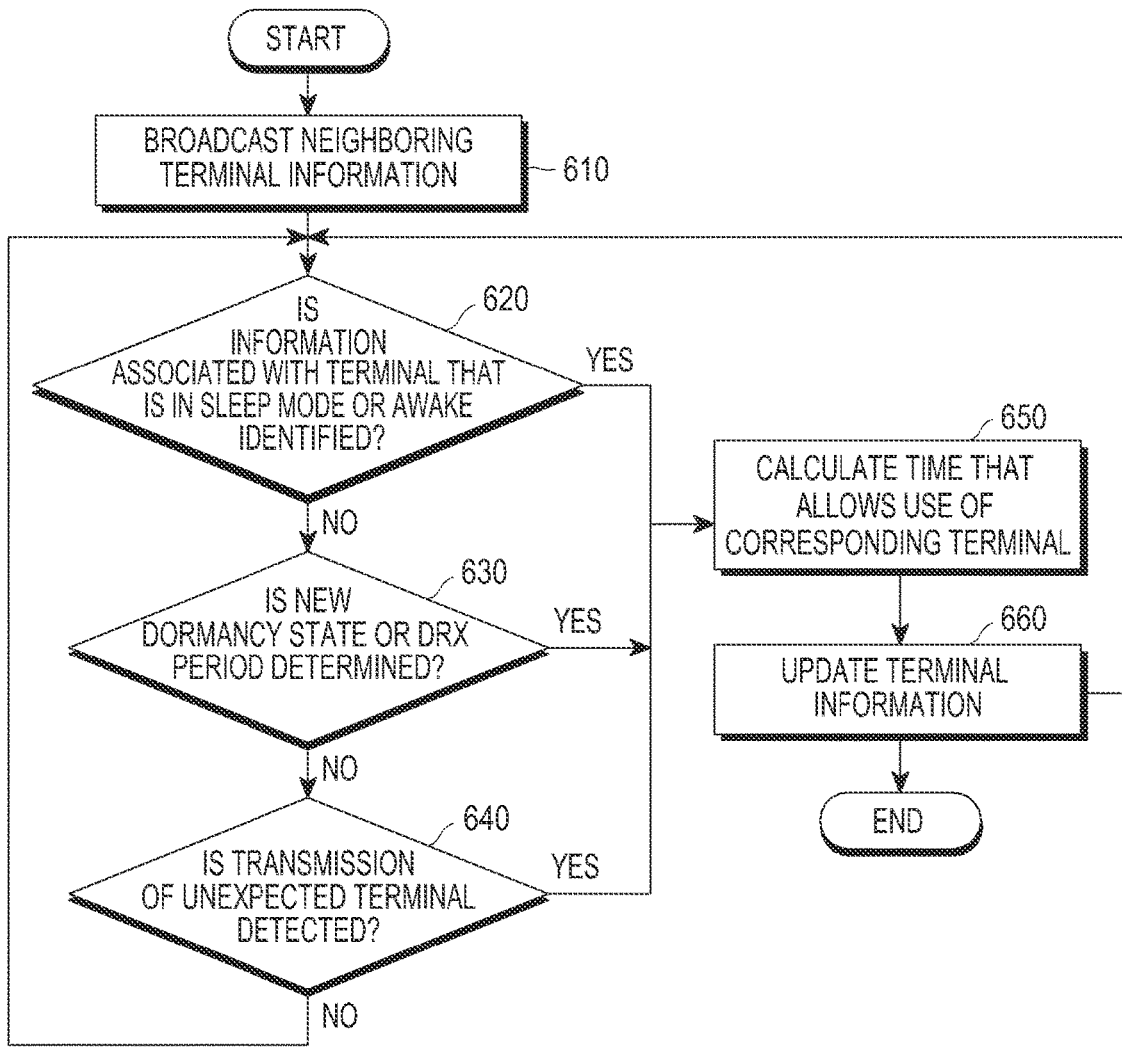
FIG. 6 is a flowchart illustrating an example of an operation of managing information associated with a neighboring terminal, in a terminal, according to various embodiments of the present disclosure.

FIG. 6 is a flowchart illustrating an example of an operation of managing information associated with a neighboring terminal, in a terminal, according to various embodiments of the present disclosure.

Referring to FIG. 6, a terminal may obtain neighboring terminal information in operation 610. For example, the terminal may obtain at least one of transmission time, a Receive Signal Strength Indicator (RSSI), a SINR, a Bit Error Ratio (BER), a valid timer, dormancy state information, as the neighboring terminal information.

The terminal may determine a distance to a terminal to which a request for data is to be transmitted or a communication status, based on the at least one obtained information from among the transmission time, the RSSI, the SINR, the BER, and the like. For example, the terminal may set a transmission power based on the determined distance or communication status.

In operation 620, the terminal may determine information associated with a terminal that is in a sleep mode or is awake.

When the determination in operation 620 shows that the information associated with a terminal that is in a sleep mode or is awake is not identified, the terminal may determine a new dormancy state or a Discontinuous Receive (DRX) period in operation 630.

When the determination in operation 620 shows that the information associated with a terminal that is in a sleep mode or is awake is identified, the terminal may calculate a time that allows the use of the determined terminal that is in a sleep mode or is awake.

In operation 660, the terminal may update the terminal information by including the calculated time.

When the determination in operation 630 shows that the new dormancy state or DRX period is not determined, the terminal may determine whether transmission from an unexpected terminal is detected in operation 640.

When the determination in operation 630 shows that the new dormancy state or DRX period is determined, the terminal may calculate a time that allows the use of the terminal based on the determined new dormancy state or DRX period in operation 650.

In operation 660, the terminal may update the terminal information by including the calculated time.

When the determination in operation 640 shows that the transmission from an unexpected terminal is not detected, the terminal may determine information associated with a terminal that is in a sleep mode or is awake again in operation 620.

When the determination in operation 640 shows that transmission from an unexpected terminal is determined, the terminal may calculate a time that allows the use of the unexpected terminal based on the transmission from the unexpected terminal in operation 650.

In operation 660, the terminal may update the terminal information by including the calculated time.

Figure 7:
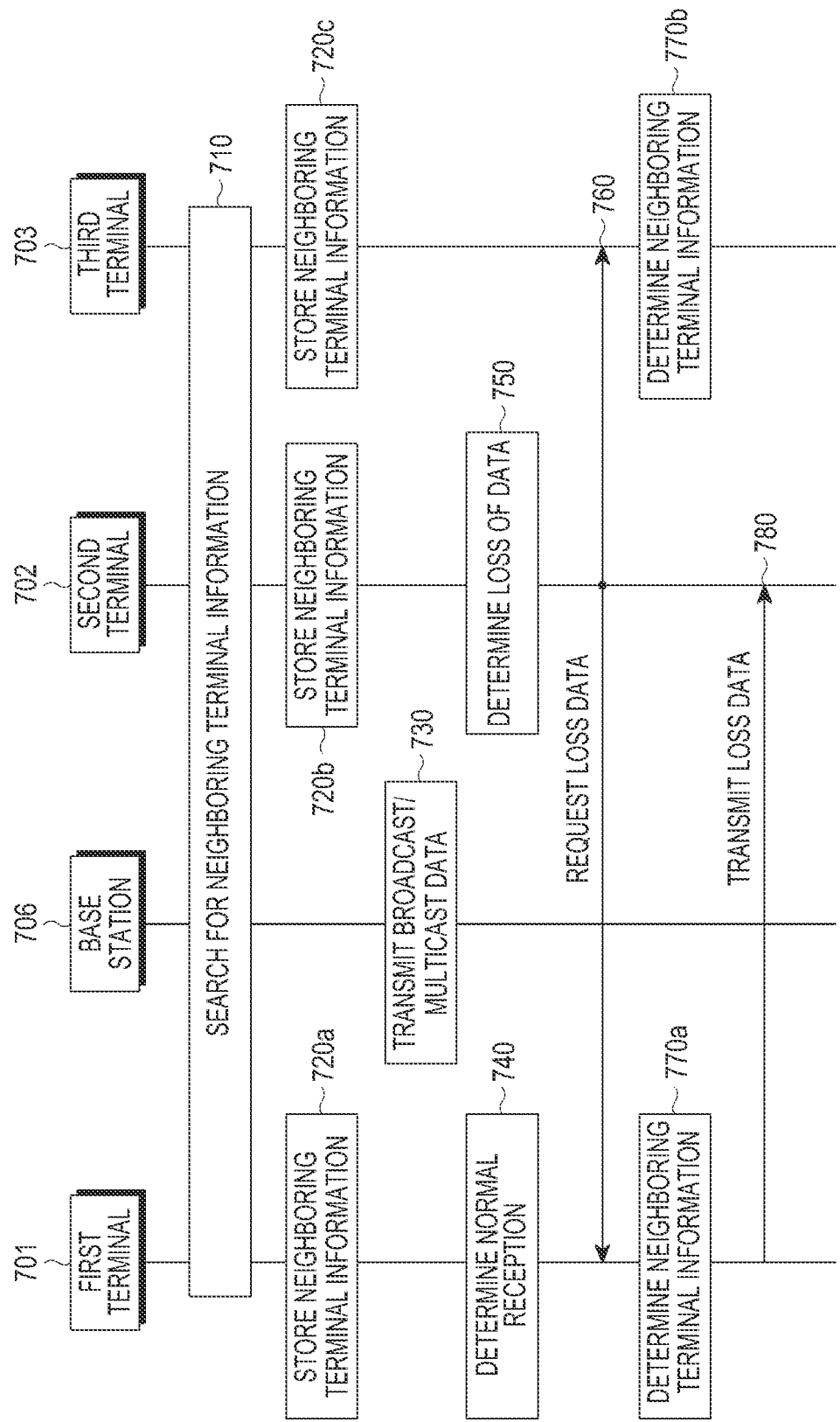
FIG. 7 is a flowchart illustrating an example of an operation for communication between at least one terminal and a base station according to various embodiments of the present disclosure.

FIG. 7 is a flowchart illustrating an example of an operation for communication between at least one terminal and a base station according to various embodiments of the present disclosure.

Referring to FIG. 7, in operation 710, at least one terminal (e.g., a first terminal 701, a second terminal 702, or a third terminal 703) may search for information associated with a neighboring terminal.

In operations 720a, 720b, and 720c, the first terminal 701, the second terminal 702, and the third terminal 703 may respectively store information associated with a neighboring terminal, which is obtained by a corresponding terminal.

In operation 730, a base station 706 may transmit data to each terminal (e.g., the first terminal 701, the second terminal 702, or the third terminal 703) through broadcasting or multicasting. According to various embodiments of the present disclosure, the data transmitted through broadcasting or multicasting, may be set in advance to be transmitted at a set time.

In operation 740, the first terminal 701 may determine that data transmitted from the base station 706 is normally received.

In operation 750, the second terminal 702 may determine that data transmitted from the base station 706 is lost. For example, when the data transmitted through broadcasting or multicasting is not transmitted at the time set in advance or errors occur while the data is decoded, the at least one terminal may determine that the corresponding data is lost.

In operation 760, the second terminal 702 may request data of which loss is determined from a neighboring terminal (e.g., the first terminal 701 or the third terminal 703).

In operation 770a, the first terminal 701 may determine the neighboring terminal information stored in operation 702a. For example, the neighboring terminal information stored in operation 702a may include information indicating that the first terminal 701 is capable of transmitting loss data to a neighboring terminal at a predetermined time.

In operation 770b, the third terminal 703 may determine the neighboring terminal information stored in operation 702a. For example, the neighboring terminal information stored in operation 702c may include information indicating that the second terminal 702 is incapable of transmitting loss data to a neighboring terminal or information indicating that another terminal that has a higher transmission rate exists.

In operation 780, the first terminal 701 may transmit loss data to the second terminal 702.

Figure 8:
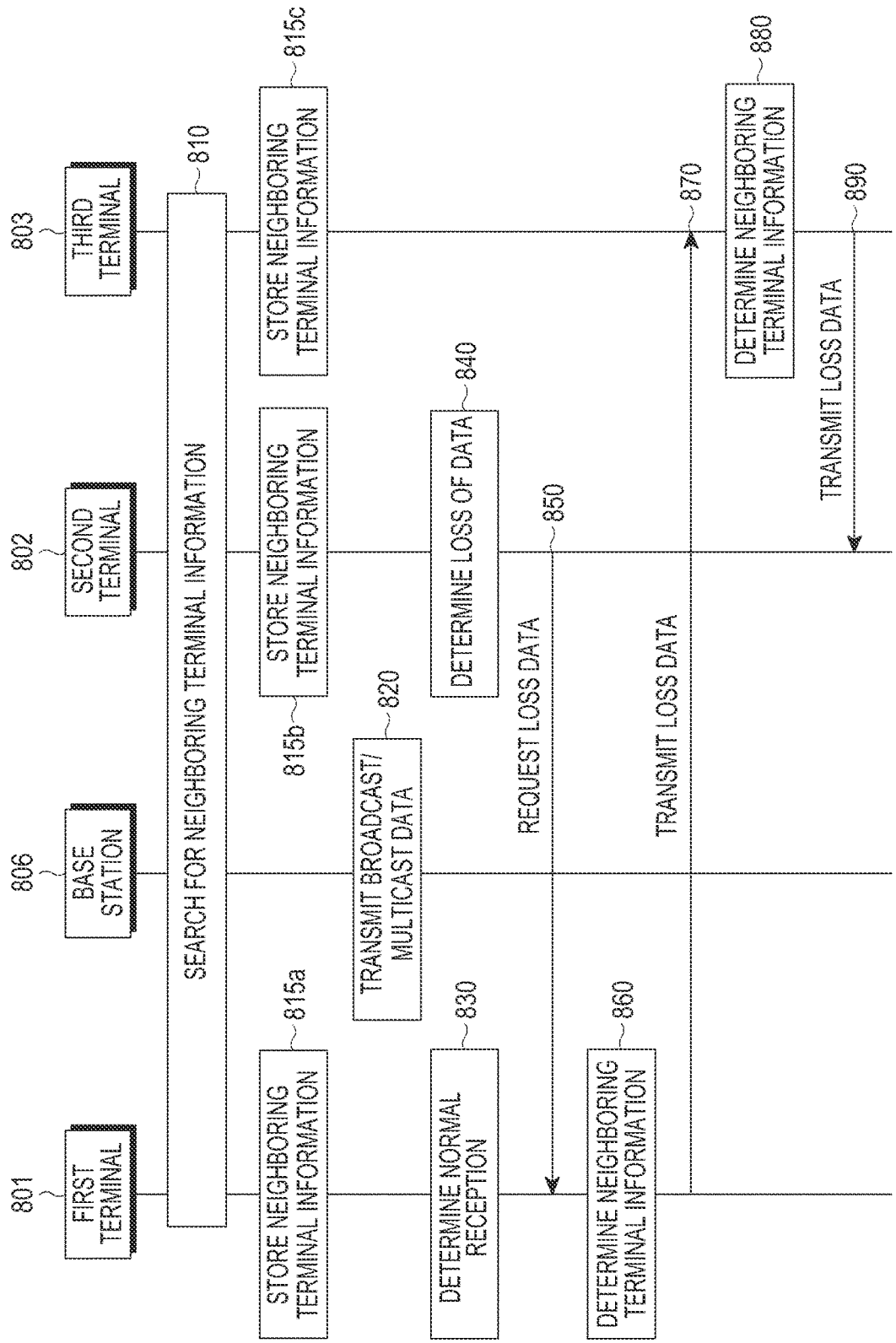
FIG. 8 is a flowchart illustrating an example of an operation for communication between at least one terminal and a base station according to various embodiments of the present disclosure.

FIG. 8 is a flowchart illustrating an example of an operation for communication between at least one terminal and a base station according to various embodiments of the present disclosure.

Referring to FIG. 8, in operation 810, at least one terminal (e.g., a first terminal 801, a second terminal 802, or a third terminal 803) may search for information associated with a neighboring terminal.

In operation 815a, the first terminal 801 may store the retrieved neighboring terminal information.

In operation 815b, the second terminal 802 may store the retrieved neighboring terminal information.

In operation 815c, the third terminal 803 may store the retrieved neighboring terminal information.

In operation 820, a base station 820 may transmit data through broadcasting or multicasting.

In operation 830, the first terminal 801 may determine that data transmitted from the base station 806 is normally received.

In operation 840, the second terminal 802 may determine that data transmitted from the base station 806 is lost. According to various embodiments of the present disclosure, when the data transmitted through broadcasting or multicasting is not transmitted at a time set in advance or errors occur while the data is decoded, the at least one terminal may determine that the corresponding data is lost.

In operation 850, the second terminal 802 may request data of which loss is determined from a neighboring terminal (e.g., the first terminal 801). For example, the second terminal 802 may request the loss data at a minimum transmission power that the neighboring terminal may receive. The second terminal 802 may determine the minimum transmission power that the neighboring terminal may receive, based on the neighboring terminal information retrieved in advance.

In operation 860, the first terminal 801 may determine the neighboring terminal information. For example, a result of determining the neighboring terminal information may show that the first terminal 801 is incapable of transmitting loss data due to a communication scheme or a communication status, and the like.

In operation 870, the first terminal 801 may transfer, to the third terminal 803, a loss data request for requesting transmission of loss data to the second terminal 802. For example, the first terminal 801 may determine that the third terminal 803 is a terminal that is capable of transmitting loss data to the second terminal 802, based on the neighboring terminal information. Accordingly, the third terminal 803 may receive the loss data request from the first terminal 801.

In operation 880, the third terminal 803 may determine the neighboring terminal information.

In operation 890, the third terminal 803 may transmit loss data to the second terminal 802. For example, the third terminal 803 may transmit the loss data by lowering a transmitting power, based on the neighboring terminal information.

Figure 9:
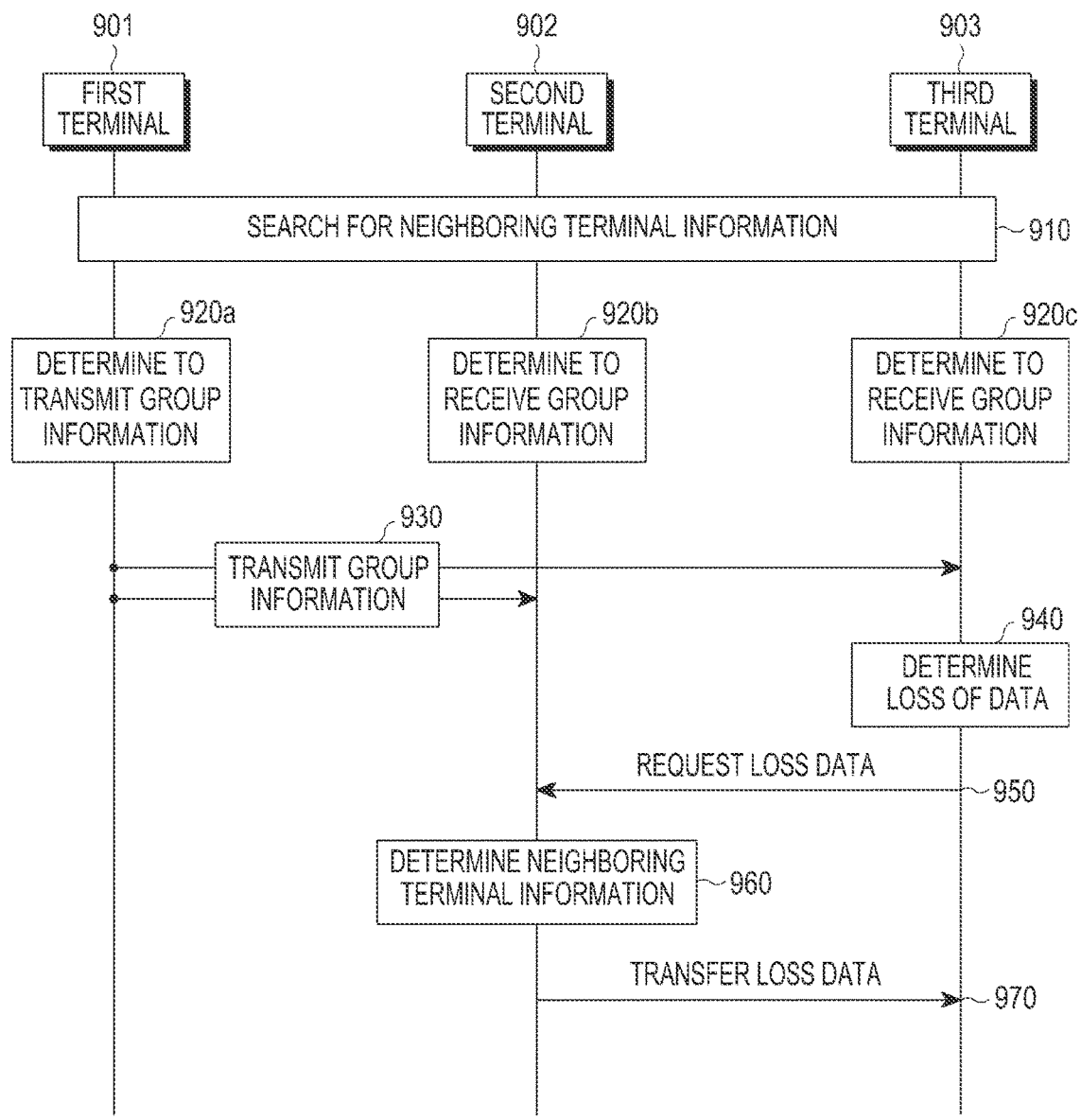
FIG. 9 is a flowchart illustrating an example of an operation executed among terminals according to various embodiments of the present disclosure.

FIG. 9 is a flowchart illustrating an example of an operation executed among terminals according to various embodiments of the present disclosure.

Referring to FIG. 9, in operation 910, at least one terminal (e.g., a first terminal 901, a second terminal 902, or a third terminal 903) may search for information associated with a neighboring terminal.

According to a result of the search, in operation 920a, the first terminal 901 may determine to transmit group information to other terminals.

According to a result of the search, in operations 920b and 920c, the second terminal 902 and the third terminal 903 may determine to receive group information from other terminals, respectively.

In operation 930, the first terminal 901 may transmit the group information to other terminals (e.g., the second terminal 902 or the third terminal 903). According to various embodiments of the present disclosure, each terminal may be aware of a time for transmitting or receiving group information, through an operation of searching for the neighboring terminal information.

In operation 940, the third terminal 903 may determine that data is lost. For example, the data may be group information that is recognized, in advance, to be transmitted or received.

In operation 950, the third terminal 903 may request loss data from the second terminal 902. For example, when the third terminal 903 determines that the second terminal 902 is to receive group information, based on the neighboring terminal information, the third terminal 903 may request the loss data from the second terminal 902.

In operation 960, the second terminal 902 may determine neighboring terminal information.

In operation 970, the second terminal 902 may transmit loss data to the third terminal 903. For example, the second terminal 902 may transmit the loss data by lowering a transmitting power, based on the neighboring terminal information.

Figure 10:
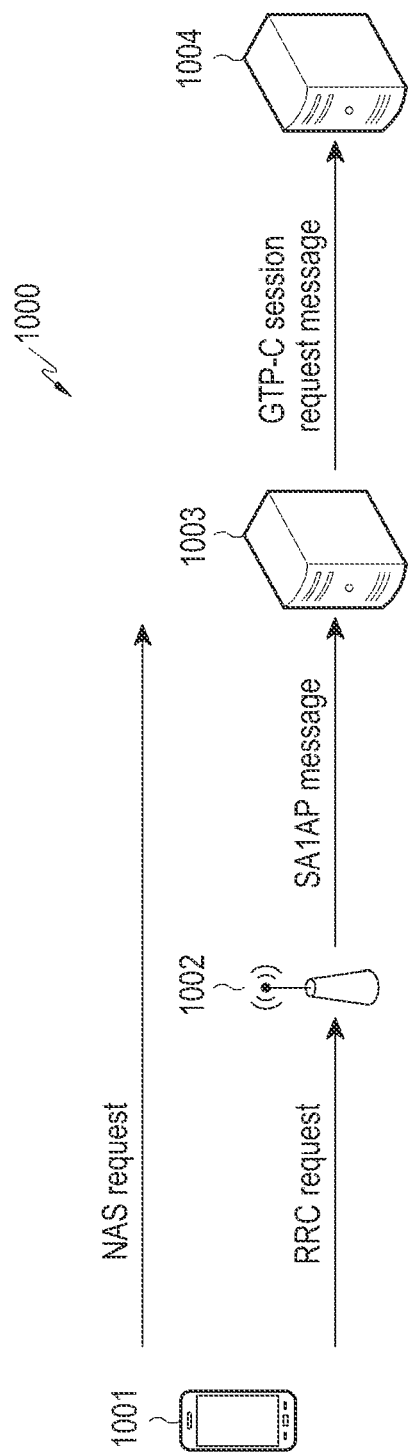
FIG. 10 is a diagram illustrating an example of a network environment including an electronic device according to various embodiments of the present disclosure.

FIG. 10 is a diagram illustrating an example of a network environment including an electronic device according to various embodiments of the present disclosure.

Referring to FIG. 10, a network environment 1000 may include a terminal 1001, a base station 1002 (e.g., a Radio Network Controller (RNC), an NB, or an eNB), a Core Network (CN) 1003 (e.g., a Serving General Packet Radio Services (GPRS) Support Node (SGSN) or a Mobility Management Entity (MME)), and an exchanger 1004 (e.g., a Gateway General Support Node (GGSN), a Serving GateWay (SGW) or a Packet data network GateWay (PGW)).

According to various embodiments of the present disclosure, in the network environment 1000, at least one electronic device (e.g., the terminal 1001, the base station 1002, the MME 1003, or the exchanger 1004) may search for information associated with a neighboring terminal. For example, the information associated with neighboring terminals may include feature or capability information of a corresponding terminal. For example, the information associated with neighboring terminals may include information associated with a sensor or module included in a predetermined terminal, information associated with whether communication backs off based on a communication status, or information associated with an operation executed by a predetermined terminal.

According to various embodiments of the present disclosure, the base station 1002 searches for neighboring terminal information, and sets priorities for communication of terminals based on a communication status. For example, the base station 1002 may transmit a message including current communication status information (e.g., communication backs off during 16 to 1800 sec, to at least one terminal that is set to have a low priority for communication.

In addition, according to various embodiments of the present disclosure, as a predetermined terminal is assigned with a low priority for communication, the base station 1002 may transmit, to the corresponding terminal, a message indicating that communication is rejected. The communication reject message may further include content for requesting transmission of communication status of the corresponding terminal to another terminal.

According to various embodiments of the present disclosure, the at least one electronic device (e.g., the terminal 1001, the base station 1002, the MME 1003, or the exchanger 1004) may transfer the communication reject message to another terminal, based on the retrieved neighboring terminal information. For example, as a message for transferring the communication reject message, the terminal 1001 may broadcast a Network Attached Storage (NAS) request message or transmit a Radio Resource Control (RRC) request message to the base station 1002, the base station 1002 may transmit an SA1AP message to the MME 1003, and the MME 1003 may transmit a GTP session request message to the exchanger 1004.

According to various embodiments of the present disclosure, a terminal that receives the communication reject message, may transfer the received message to at least one of the neighboring terminals, based on the current communication status. For example, the terminal 1001 is assumed to receive the communication reject message while executing communication related to a predetermined function (e.g., measuring temperature). In this instance, the terminal 1001 may transfer the received message to at least one electronic device including a configuration related to the corresponding communication (e.g., a sensor or a module), based on the retrieved neighboring terminal information. In addition, when the received message is transferred, the terminal 1001 may request the at least one electronic device to execute a predetermined function, and may further request sending data associated with a result of the execution at a predetermined time.

Figure 11:
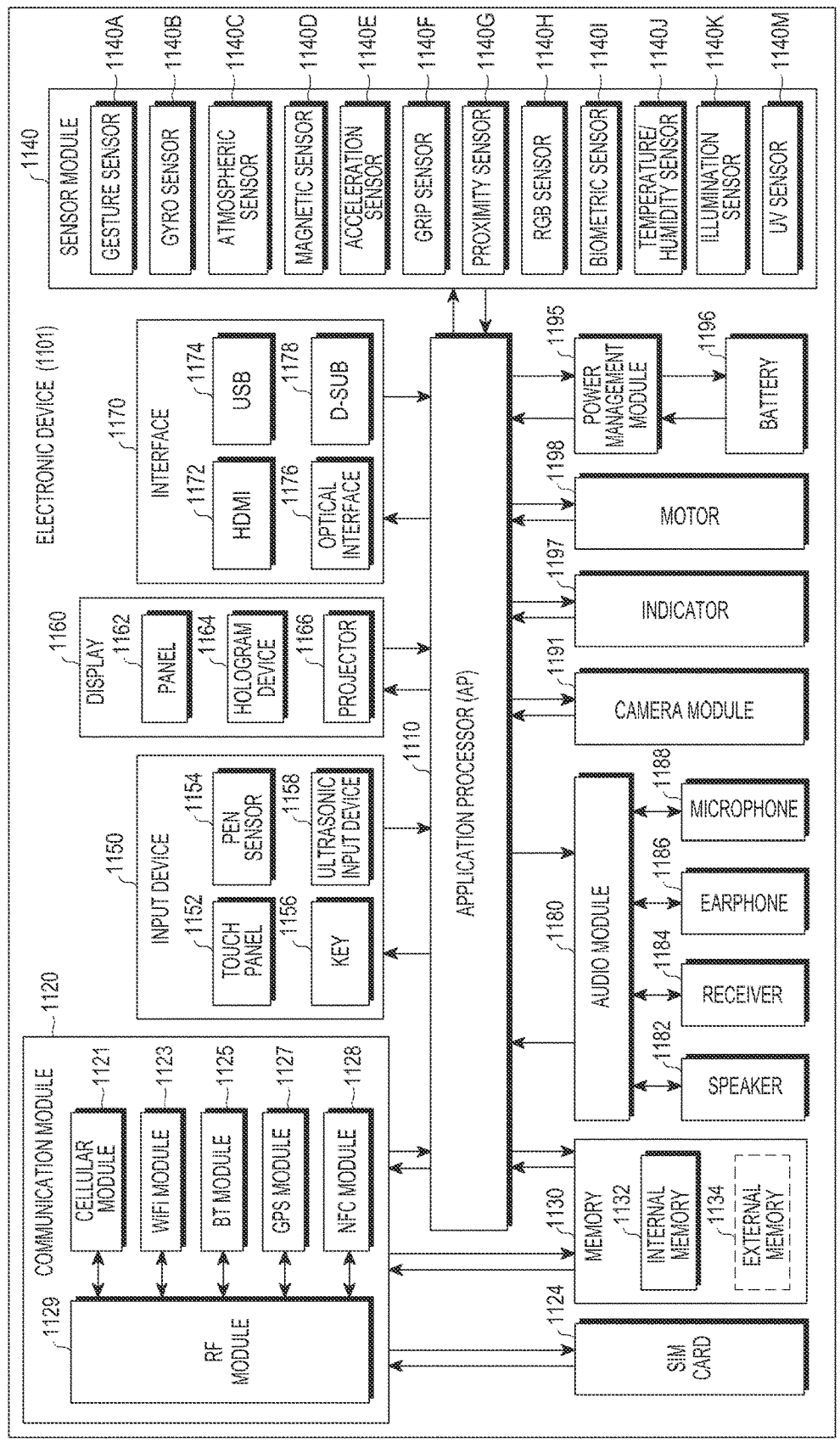
FIG. 11 is a block diagram illustrating an example of a configuration of an electronic device according to various embodiments of the present disclosure.

FIG. 11 is a block diagram illustrating an example of a configuration of an electronic device according to various embodiments of the present disclosure. An electronic device 1101 may form, for example, a part of or the entirety of the electronic device 101 illustrated in FIG. 1.

Referring to FIG. 11, the electronic device 1101 may include at least one of an Application Processor (AP) 1110, a communication module 1120, a Subscriber Identifier Module (SIM) card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110 may control a plurality of hardware or software components connected to the AP 1110 by driving an operating system or an application program, process various data including multimedia data, and perform calculations. The AP 1110 may be embodied as, for example, a System on Chip (SoC). According to an embodiment, the AP 1110 may further include a graphic processing unit (GPU) (not illustrated).

The communication module 1120 (e.g., the communication interface 160) may perform data transmission/reception in communication between the electronic device 1101 (e.g., the electronic device 101) and other electronic devices (e.g., the electronic device 104 and the server 106) connected over a network. According to an embodiment of the present disclosure, the communication module 1120 may include a cellular module 1121, a Wi-Fi module 1123, a BT module 1125, a GPS module 1127, an NFC module 1128, and a radio frequency (RF) module 1129.

The cellular module 1121 may provide a voice call, a video call, an SMS, or an Internet service through a communication network (e.g., LTE, LTE-A, CDMA, WCDMA, UMTS, WiBro, GSM and the like). Furthermore, the cellular module 1121 may distinguish and authenticate electronic devices within a communication network by using a SIM (e.g., the SIM card 1124). According to an embodiment of the present disclosure, the cellular module 1121 may perform at least a part of the functions that may be provided by the AP 1110. For example, the cellular module 1121 may perform at least a part of the multimedia control function.

According to an embodiment of the present disclosure, the cellular module 1121 may include a communication processor (CP). Furthermore, the cellular module 1121 may be embodied as, for example, an SoC. Although the components such as the cellular module 1121 (e.g., the CP), the memory 1130, the power management module 1195, and the like are illustrated to be separate from the AP 1110 in FIG. 11, the AP 1110 may be embodied to include at least some of the above described components (e.g., the cellular module 1121) according to one embodiment of the present disclosure.

According to an embodiment of the present disclosure, the AP 1110 or the cellular module 1121 (e.g., a communication processor) may load, into a volatile memory, a command or data received from at least one of a non-volatile memory and other components connected thereto, and process the loaded command. Furthermore, the AP 1110 or the cellular module 1121 may store, in a non-volatile memory, data received from or generated by at least one of the other components.

Each of the Wi-Fi module 1123, the BT module 1125, the GPS module 1127, and the NFC module 1128 may include, for example, a processor for processing data transmitted/received through a corresponding module. Although each of the cellular module 1121, the Wi-Fi module 1123, the BT module 1125, the GPS module 1127, and the NFC module 1128 is illustrated as a separate block in FIG. 11, at least some (e.g., two or more) of the cellular module 1121, the Wi-Fi module 1123, the BT module 1125, the GPS module 1127, and the NFC module 1128 may be included in one integrated chip (IC) or IC package according to an embodiment of the present disclosure. For example, at least a few (e.g., a communication processor corresponding to the cellular module 1121 and a Wi-Fi processor corresponding to the Wi-Fi module 1123) of the processors corresponding to the cellular module 1121, the Wi-Fi module 1123, the BT module 1125, the GPS module 1127, and the NFC module 1128, may be embodied as a single SoC.

The RF module 1129 may transmit/receive data, for example, an RF signal. Although not illustrated, the RF module 1129 may include, for example, a transceiver, a Power Amp Module (PAM), a frequency filter, a Low Noise Amplifier (LNA), and the like. Furthermore, the RF module 1129 may further include a component for transmitting/receiving electronic waves over a free air space in wireless communication, for example, a conductor, a conducting wire and the like. Although FIG. 11 illustrates that the cellular module 1121, the Wi-Fi module 1123, the BT module 1125, the GPS module 1127, and the NFC module 1128 share a single RF module 1129, at least one of the cellular module 1121, the Wi-Fi module 1123, the BT module 1125, the GPS module 1127, and the NFC module 1128 may perform RF signal transmission/reception through a separate RF module.

The SIM card 1124 may be a card including a SIM, and may be inserted into a slot formed in a particular portion of an electronic device. The SIM card 1124 may include unique identification information (e.g., Integrated Circuit Card IDentifier (ICCID)) or subscriber information (e.g., IMSI).

The memory 1130 (e.g., memory 130) may include an embedded memory 1132 or an external memory 1134. The embedded memory 1132 may include at least one of a volatile memory (e.g., a Dynamic Random Access Memory (DRAM), a Static RAM (SRAM), a Synchronous DRAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a Not And (NAND) flash memory, a Not Or (NOR) flash memory, and the like).

According to one embodiment of the present disclosure, the embedded memory 1132 may be a Solid State Drive (SSD). The external memory 1134 may further include a flash drive, for example, a Compact Flash (CF), a Secure Digital (SD), a Micro-SD, a Mini-SD, an extreme Digital (xD), a memory stick and the like. The external memory 1134 may be functionally connected to the electronic device 1101 through various interfaces. According to an embodiment of the present disclosure, the electronic device 1101 may further include a storage device (or storage medium) such as a hard drive.

The sensor module 1140 may measure a physical quantity or detect an operation state of the electronic device 1101, and may convert the measured or detected information to an electronic signal. The sensor module 1140 may include, for example, at least one of a gesture sensor 1140A, a gyro sensor 1140B, an atmospheric pressure sensor 1140C, a magnetic sensor 1140D, an acceleration sensor 1140E, a grip sensor 1140F, a proximity sensor 1140G, a color sensor 1140H (e.g., red, green, and blue (RGB) sensor), a biometric sensor 1140I, a temperature/humidity sensor 1140J, an illumination sensor 1140K, and an Ultra Violet (UV) sensor 1140M. Additionally or alternatively, the sensor module 1140 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), an InfraRed (IR) sensor, an iris sensor (not illustrated), a fingerprint sensor (not illustrated) and the like. The sensor module 1140 may further include a control circuit for controlling at least one sensor included therein.

The input device 1150 may include a touch panel 1152, a (digital) pen sensor 1154, a key 1156, or an ultrasonic input device 1158. The touch panel 1152 may recognize a touch input through at least one of, for example, a capacitive scheme, a resistive scheme, an infrared scheme, and an ultrasonic scheme. The touch panel 1152 may further include a control circuit. The capacitive scheme touch panel may recognize physical contact or proximity. The touch panel 1152 may further include a tactile layer. In this instance, the touch panel 1152 may provide a tactile reaction to a user.

The (digital) pen sensor 1154 may be embodied, for example, using a method identical or similar to a method of receiving a touch input of a user, or using a separate recognition sheet. The key 1156 may include, for example, a physical button, an optical key or a keypad. The ultrasonic input device 1158 is a device that may detect an acoustic wave by a microphone (e.g., a microphone 1188) of the electronic device 1101 through an input tool generating an ultrasonic signal to identify data and may perform wireless recognition. According to an embodiment of the present disclosure, the electronic device 1101 may also receive a user input from an external device (e.g., a computer or a server) connected thereto by using the communication module 1120.

The display 1160 (e.g., the display 150) may include a panel 1162, a hologram device 1164, and a projector 1166. The panel 1162 may be, for example, a Liquid Crystal Display (LCD), Active-Matrix Organic Light Emitting Diode (AM-OLED), and the like. The panel 1162 may be embodied to be, for example, flexible, transparent, or wearable. The panel 1162 may be also configured as a single module with the touch panel 1152. The hologram device 1164 may show a stereoscopic image in the air by using interference of light. The projector 1166 may project light onto a screen to display an image. For example, the screen may be located inside or outside the electronic device 1101. According to an embodiment of the present disclosure, the display 1160 may further include a control circuit for controlling the panel 1162, the hologram device 1164, or the projector 1166.

The interface 1170 may include, for example, an HDMI 1172, a USB 1174, an optical interface 1176, or a D-sub-miniature (D-sub) 1178. The interface 1170 may be included in, for example, the communication interface 160 illustrated in FIG. 1. Additionally or alternatively, the interface 290 may include, for example, a Mobile High-definition Link (MHL) interface, an SD card/Multi-Media Card (MMC) interface, or an Infrared Data Association (IrDA) standard interface.

The audio module 1180 may bi-directionally convert a sound and an electronic signal. At least some components of the audio module 1180 may be included in, for example, the input/output interface 140 illustrated in FIG. 1. The audio module 1180 may process sound information input or output through, for example, a speaker 1182, a receiver 1184, earphones 1186, the microphone 1188 and the like.

The camera module 1191 is a device that may photograph still and moving images, and according to an embodiment of the present disclosure, may include one or more image sensors (e.g., a front sensor or a back sensor), a lens (not illustrated), an image signal processor (ISP) (not shown), or a flash (e.g., an LED or a xenon lamp, not illustrated).

The power management module 1195 may manage power of the electronic device 1101. Although not illustrated, the power management module 1195 may include, for example, a Power Management IC (PMIC), a charger IC, or a battery or fuel gauge.

The PMIC may be mounted to, for example, an integrated circuit or an SoC semiconductor. Charging methods may be classified into a wired charging method and a wireless charging method. The charger IC may charge a battery and prevent the flow of over voltage or over current from a charger. According to an embodiment of the present disclosure, the charger IC may include a charger IC for at least one of the wired charging and the wireless charging. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery fuel gauge may measure, for example, a remaining quantity of the battery 1196, or a voltage, a current, or a temperature during charging. The battery 1196 may store or generate electricity, and may supply power to the electronic device 1101 using the stored or generated electricity. The battery 1196 may include, for example, a rechargeable battery or a solar battery.

The indicator 1197 may display a predetermined status of the electronic device 1101 or a part thereof (e.g., the AP 1110), for example, a boot-up status, a message status, a charging status, and the like. The motor 1198 may convert an electrical signal to a mechanical vibration. Although not illustrated, the electronic device 1101 may include a processing unit (e.g., GPU) for supporting a mobile TV. The processing unit for supporting the mobile TV may process media data according to a standard of Digital Multimedia Broadcasting (DMB), Digital Video Broadcasting (DVB), media flow and the like.

Each of the above described elements of the electronic device according to various embodiments of the present disclosure may be formed of one or more components, and the name of a corresponding element may vary according to the type of an electronic device. The electronic device according to various embodiments of the present disclosure may be formed to include at least one of the above described components, and some of the components may be omitted or additional components may be further included. Further, some of the elements of the electronic device according to various embodiments of the present disclosure may be coupled to form a single entity while performing the same functions as those of the corresponding elements before the coupling.

The term "module" used in various embodiments of the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to various embodiments of the present disclosure may include at least one of an Application-Specific IC (ASIC) chip, a Field-Programmable Gate Arrays (FPGA), and a programmable-logic device for performing operations which have been known or are to be developed hereinafter.

At least some of the devices (e.g., modules or functions thereof) or methods (e.g., operations) according to various embodiments of the present disclosure may be implemented by, for example, by a command stored in a computer-readable storage medium in the form of a programming module. When the instruction is performed by at least one processor (e.g., the processor 120), the at least one processor may perform a function corresponding to the instruction. The computer-readable storage medium may be, for example, the memory 130. At least some of the programming modules may be implemented (e.g., executed) by, for example, the processor 120. At least a part of the programming module may include, for example, a module, a program, a routine, a set of instructions and/or a process for performing one or more functions.

The computer-readable recording medium may include magnetic media such as a hard disk, a floppy disk, and a magnetic tape, optical media such as a Compact Disc ROM (CD-ROM) and a DVD, magneto-optical media such as a floptical disk, and hardware devices specially configured to store and perform a program instruction (e.g., programming module), such as a ROM, a RAM, a flash memory and the like. In addition, the program instructions may include high class language codes, which may be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

According to various embodiments of the present disclosure, a storage medium that stores instructions is provided, and the instructions are set to indicate at least one processor to execute at least one operation when the instructions are executed by the at least one processor, wherein the at least one operation includes: searching for information associated with at least one neighboring terminal; when loss of data that is transmitted to a plurality of electronic devices is determined, requesting at least one of the neighboring terminals to transmit the data of which loss is determined, based on the retrieved information associated with at least one neighboring terminal; and receiving the data of which loss is determined, in response to the request.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for an electronic device to process data, the method comprising:
   receiving data broadcasted or multicasted from a base station through a first network;
   determining that a loss of the data broadcasted or multicasted from the base station is occurred;
   identifying at least one neighboring terminal via a discovery process through a second network;
   broadcasting or multicasting a request message for the lost data to the identified at least one neighboring terminal through the second network, wherein the request message includes time information associated with a time at which the data is lost; and
   receiving data corresponding to the lost data from the identified at least one neighboring terminal through the second network.

2. The method of claim 1, further comprising:
   obtaining information associated with the at least one neighboring terminal by the discovery process.

3. The method of claim 1, further comprising:
   setting a transmission/reception power based on information associated with the at least one neighboring terminal,
   wherein the request message further includes information on the set transmission/reception power.

4. The method of claim 1, further comprising:
   determining data whose reception is scheduled; and
   when the data is not identified at the scheduled time, determining that the data is lost.

5. The method of claim 1, further comprising:
   when the received data is abnormally decoded, determining that the abnormally decoded data or the received data is lost.

6. The method of claim 1, further comprising:
   when a communication reject message is received while communication related to a predefined function to measure the received data is being executed, transferring the received data to at least one terminal configured to execute the predefined function for measuring the received data, based on information associated with the at least one neighboring terminal.

7. The method of claim 1,
wherein the data broadcasted or multicasted from the base station through the first network is received periodically.

8. The method of claim 1, further comprising:
determining a time for entering a sleep mode of a certain terminal based on information associated with the at least one neighboring terminal,
wherein the request message is transmitted after the time for entering the sleep mode.

9. The method of claim 1, further comprising:
determining a communication scheme for retransmitting the loss data, based on information associated with the at least one neighboring terminal,
wherein the request message further includes information about the determined communication scheme.

10. The method of claim 1,
wherein the request message further includes time information associated with a desired time for reception, and
wherein the data corresponding to the loss data is received at the desired time for reception.

11. The method of claim 1, further comprising:
managing information associated with the at least one neighboring terminal; and
when information associated with at least one new neighboring terminal is determined, updating the information associated with the at least one neighboring terminal.

12. The method of claim 1, further comprising:
predicting a time when communication is unavailable, based on information associated with the at least one neighboring terminal,
wherein the data corresponding to the loss data is received, after the predicted time.

13. The method of claim 1,
wherein the data broadcasted or multicasted from the base station includes at least one of group paging information, system information, master information block (MIB) information, and system information block (SIB) information.

14. The method of claim 1, wherein the request message includes data identification information, the data identification information including at least one of time information associated with when reception of a predetermined data fails, time information associated with when decoding of received data fails, frame information, sequence information, hybrid automatic retransmit request (HARQ) information, and acknowledgement (ACK) information.

15. An electronic device comprising:
a communication interface; and
at least one processor configured to:
control the communication interface to receive data broadcasted or multicasted from a base station through a first network,
determine that a loss of the data broadcasted or multicasted from the base station is occurred,
identify at least one neighboring terminal via a discovery process through a second network,
broadcast or multicast a request message for the lost data to the identified at least one neighboring terminal through the second network, wherein the request message includes time information associated with a time at which the data is lost, and
control the communication interface to receive data corresponding to the loss data, from the identified at least one neighboring terminal through the second network.

16. The electronic device of claim 15, wherein the at least one processor is further configured to:
control the communication interface to obtain information associated with the at least one neighboring terminal by the discovery process.

17. The electronic device of claim 15, wherein the at least one processor is further configured to:
set a transmission power based on information associated with the at least one neighboring terminal, and
control the communication interface to the request message at the set transmission power.

18. The electronic device of claim 15, wherein the at least one processor is further configured:
determine data whose reception is scheduled, and
determine that the data is lost when the data is not identified at the scheduled time.

19. The electronic device of claim 15, wherein, when reception of data is detected through the communication interface and the received data is abnormally decoded, the at least one processor is further configured to determine that the abnormally decoded data or the received data is lost.

20. The electronic device of claim 15, wherein, when a communication reject message is received while communication related to a predefined function to measure the received data is being executed, the at least one processor is further configured to control the communication interface to transfer the received data to at least one terminal configured to execute the predefined function for measuring the received data, based on information associated with the at least one neighboring terminal.

21. The electronic device of claim 15, wherein the at least one processor is further configured to:
control the communication interface to receive data broadcasted or multicasted from the base station through the first network data, periodically.

22. The electronic device of claim 15, wherein the at least one processor is further configured to:
determine a time for entering a sleep mode of a certain terminal based on information associated with the at least one neighboring terminal, and
control the communication interface to transmit the request message after the time for entering the sleep mode.

23. The electronic device of claim 15, wherein the at least one processor is further configured to:
determine a communication scheme for retransmitting the loss data, based on information associated with the at least one neighboring terminal, and
control the communication interface to transmit the request message, based on the determined communication scheme.

24. The electronic device of claim 15, wherein the at least one processor is further configured to:
include, in the request message, time information associated with a desired time for reception, and
control the communication interface to receive the data corresponding to the loss data, at the desired time for reception.

25. The electronic device of claim 15, wherein the at least one processor is further configured to:
manage information associated with the at least one neighboring terminal, and
update, when information associated with at least one new neighboring terminal is determined, the information associated with the at least one neighboring terminal.

26. The electronic device of claim 15, wherein the at least one processor is further configured to:

predict a time when communication is unavailable, based on information associated with the at least one neighboring terminal, and control the communication interface to receive the data corresponding to the loss data, after the predicted time.

27. The electronic device of claim 15, wherein the data broadcasted or multicasted from the base station includes at least one of group paging information, system information, master information block (MIB) information, and system information block (SIB) information.

28. The electronic device of claim 15, wherein the request message includes data identification information, the data identification information including at least one of time information associated with when reception of a predetermined data fails, time information associated with when decoding of received data fails, frame information, sequence information, hybrid automatic retransmit request (HARQ) information, and acknowledgement (ACK) information.

29. The method of claim 1, wherein the discovery process is performed periodically, or the discovery process is performed when the loss of data boradcasted or multicasted from the base station is determined.

30. The method of claim 1, wherein the first network corresponds to a cellular network connected to the base station and the second network corresponds to a short-range communication network.

31. The electronic device of claim 15, wherein the at least one processor is further configured to:

control the communication interface to perform the discovery process periodically, or to perform the discovery process when the loss of data broadcasted or multicasted from the base station is determined.

32. The electronic device of claim 15, wherein the first network corresponds to a cellular network connected to the base station and the second network corresponds to a short-range communication network.

* * * * *